United States Patent
Kano et al.

(10) Patent No.: US 9,620,757 B2
(45) Date of Patent: Apr. 11, 2017

(54) NONAQUEOUS ELECTROLYTE BATTERY AND BATTERY PACK

(71) Applicant: KABUSHIKI KAISHA TOSHIBA, Minato-ku (JP)

(72) Inventors: Tetsuro Kano, Kashiwazaki (JP); Hiromichi Kuriyama, Kashiwazaki (JP); Yuki Watanabe, Kashiwazaki (JP); Hidesato Saruwatari, Kashiwazaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 72 days.

(21) Appl. No.: 14/645,846

(22) Filed: Mar. 12, 2015

(65) Prior Publication Data
US 2016/0036026 A1 Feb. 4, 2016

(30) Foreign Application Priority Data

Jul. 31, 2014 (JP) .................................. 2014-157107
Mar. 5, 2015 (JP) .................................. 2015-043816

(51) Int. Cl.
*H01M 4/485* (2010.01)
*H01M 4/131* (2010.01)
(Continued)

(52) U.S. Cl.
CPC ......... *H01M 2/1673* (2013.01); *H01M 4/131* (2013.01); *H01M 4/364* (2013.01);
(Continued)

(58) Field of Classification Search
CPC ............... H01M 2/1673; H01M 4/664; H01M 10/0525; H01M 4/58; H01M 4/667;
(Continued)

(56) References Cited

U.S. PATENT DOCUMENTS

2006/0068290 A1* 3/2006 Sawa ................. C01G 45/1228
429/231.1
2007/0072080 A1* 3/2007 Inagaki ................. H01M 4/131
429/231.1
2015/0132639 A1 5/2015 Kodama

FOREIGN PATENT DOCUMENTS

EP 1 530 248 A2 5/2005
EP 1 594 179 A2 11/2005
(Continued)

OTHER PUBLICATIONS

Mun, Linear-sweep thermammetry study on corrosion behavior of al current collector in ionic liquid solvent, Electrochemical amd Solid-State Letters 13 (8), A109-A111 (2010).*
(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, there is provided a nonaqueous electrolyte battery. The nonaqueous electrolyte battery includes a negative electrode, a positive electrode, and a nonaqueous electrolyte. The negative electrode includes an oxide of titanium. The positive electrode includes a positive electrode current collector including aluminum, a positive electrode layer including a nickel-cobalt-manganese composite oxide including lithium, and a passive film formed on the positive electrode current collector. A ratio p/n of a capacity p of the positive electrode to a capacity n of the negative electrode falls within the range from 1.1 to 1.8.

17 Claims, 6 Drawing Sheets

(51) Int. Cl.

| | |
|---|---|
| *H01M 2/16* | (2006.01) |
| *H01M 4/505* | (2010.01) |
| *H01M 4/525* | (2010.01) |
| *H01M 4/36* | (2006.01) |
| *H01M 4/58* | (2010.01) |
| *H01M 4/66* | (2006.01) |
| *H01M 10/0525* | (2010.01) |
| *H01M 10/0567* | (2010.01) |
| *H01M 4/02* | (2006.01) |
| *H01M 10/42* | (2006.01) |

(52) U.S. Cl.
CPC ........... *H01M 4/485* (2013.01); *H01M 4/505* (2013.01); *H01M 4/525* (2013.01); *H01M 4/58* (2013.01); *H01M 4/661* (2013.01); *H01M 4/664* (2013.01); *H01M 4/667* (2013.01); *H01M 10/0525* (2013.01); *H01M 10/0567* (2013.01); *H01M 2004/027* (2013.01); *H01M 2004/028* (2013.01); *H01M 2010/4292* (2013.01)

(58) Field of Classification Search
CPC .. H01M 4/661; H01M 4/364; H01M 10/0567; H01M 4/505; H01M 4/525; H01M 4/485; H01M 4/131; H01M 2010/4292; Y02E 60/122
See application file for complete search history.

(56) References Cited

FOREIGN PATENT DOCUMENTS

| | | |
|---|---|---|
| EP | 1 803 176 A1 | 7/2007 |
| JP | 2004-134207 A | 4/2004 |
| WO | WO 2014/017464 A1 | 1/2014 |

OTHER PUBLICATIONS

U.S. Appl. No. 14/640,934, filed Mar. 6, 2015, Kuriyama, et al.
U.S. Appl. No. 14/644,826, filed Mar. 11, 2015, Kuriyama, et al.
U.S. Appl. No. 14/644,879, filed Mar. 11, 2015, Saruwatari, et al.
Extended European Search Report issued Oct. 16, 2015 in Patent Application No. 15158788.8.
Xueyuan Zhang, et al., "Factors That Influence Formation of $AlF_3$ Passive Film on Aluminum in Li-Ion Battery Electrolytes with $LiPF_6$," Journal of the Electrochemical Society, vol. 153, No. 9, XP055218096, 2006, pp. B375-B383.
Tsutomu Ohzuku, et al., "Layered Lithium Insertion Material of $LiCo_{1/3}Ni_{1/3}Mn_{1/3}O_2$ for Lithium-Ion Batteries" Chemistry Letters, XP009015329, 2001, pp. 642-643.
Tsutomu Ohzuku, et al., "Zero-Strain Insertion Material of $Li[Li_{1/3}Ti_{5/3}]O_4$ for Rechargeable Lithium Cells" J. Electrochem. Soc., vol. 142, No. 5, XP002401681, 1995, pp. 1431-1435.
Y. Liu, et al., "Novel composite anodes based on layered lithium transition metal nitrides for lithium secondary batteries" Solid State Ionics, vol. 172, XP055218387, 2004, pp. 69-72.
Y. Takeda, et al., "Advanced composite anodes containing lithium cobalt nitride for secondary lithium battery" Solid State Ionics, vol. 152-153, XP055218208, 2002, pp. 35-41.

* cited by examiner

US 9,620,757 B2

NONAQUEOUS ELECTROLYTE BATTERY AND BATTERY PACK

CROSS-REFERENCE TO RELATED APPLICATIONS

This application is based upon and claims the benefit of priority from the Japanese Patent Application No. 2014-157107, filed Jul. 31, 2014; and No. 2015-043816, filed Mar. 5, 2015, the entire contents of all of which are incorporated herein by reference.

FIELD

Embodiments described herein relate generally to a nonaqueous electrolyte battery, a method of manufacturing a nonaqueous battery, and a battery pack.

BACKGROUND

Various attempts have been made to lower the open circuit voltages (OCV) of nonaqueous electrolyte batteries.

DETAILED DESCRIPTION

Figure 1:
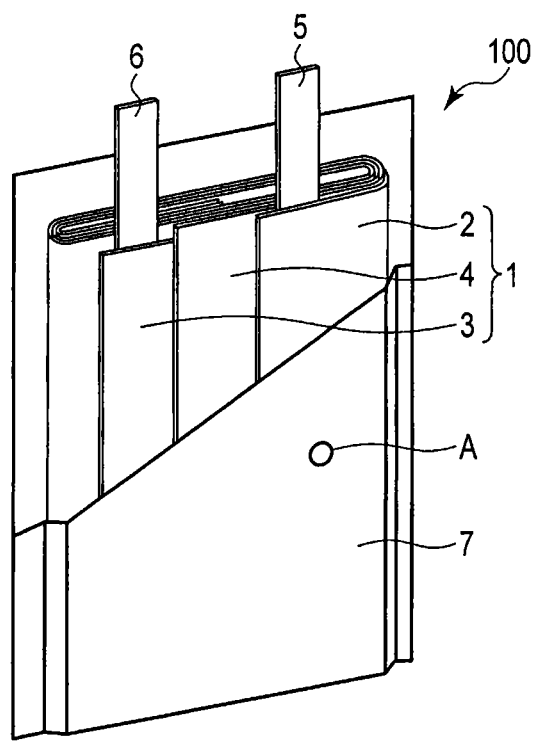
FIG. 1 is a partially cut-out perspective view of a nonaqueous electrolyte battery of a first example according to a first embodiment.

According to one embodiment, there is provided a nonaqueous electrolyte battery. The nonaqueous electrolyte battery includes a negative electrode, a positive electrode, and a nonaqueous electrolyte. The negative electrode includes an oxide of titanium. The positive electrode includes a positive electrode current collector including aluminum, a positive electrode layer formed on the positive electrode current collector and including a nickel-cobalt-manganese composite oxide including lithium, and a passive film formed by over-charge on the positive electrode current collector. A ratio p/n of a capacity p of the positive electrode to a capacity n of the negative electrode falls within the range from 1.1 to 1.8.

According to one embodiment, there is provided a method of manufacturing a nonaqueous electrolyte battery. The method includes: assembling a battery unit; and subjecting the battery unit to over-charge. The battery unit includes a negative electrode including an oxide of titanium, a positive electrode, and a nonaqueous electrolyte. The positive electrode includes a positive electrode current collector including aluminum, and a positive electrode layer formed on the positive electrode current collector and including a nickel-cobalt-manganese composite oxide including lithium. In the battery unit, a ratio p/n of a capacity p of the positive electrode to a capacity n of the negative electrode falls within the range from 1.1 to 1.8.

According to one embodiment, there is provided a battery pack including a nonaqueous electrolyte battery according to one embodiment.

According to one embodiment, there is provided a nonaqueous electrolyte battery. The nonaqueous electrolyte battery includes a negative electrode, a positive electrode, and a nonaqueous electrolyte. The negative electrode includes an oxide of titanium. The positive electrode includes a positive electrode current collector including aluminum, a positive electrode layer formed on the positive electrode current collector and including a nickel-cobalt-manganese composite oxide including lithium, and a passive film formed on the positive electrode current collector. The passive film may include a region having a ratio F/Al of 0.03 or more, where F is an emission intensity of fluorine obtained by radiofrequency glow discharge optical emission spectroscopy (GD-OES) and Al is an emission intensity of aluminum obtained by the GD-OES. The region having a ratio F/Al of 0.03 or more is desirably present within a range at a depth of 30 nm or less from a surface of the positive electrode current collector. A ratio p/n of a capacity p of the positive electrode to a capacity n of the negative electrode falls within the range from 1.1 to 1.8.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, a nonaqueous electrolyte battery is provided. This nonaqueous electrolyte battery includes a negative electrode, a positive electrode, and a nonaqueous electrolyte. The negative electrode includes an oxide of titanium. The positive electrode includes a positive electrode current collector that includes aluminum, a positive electrode layer formed on the positive electrode current collector and including a nickel-cobalt-manganese composite oxide including lithium, and a passive film formed on the positive electrode current collector. A ratio p/n of a capacity p of the positive electrode to a capacity n of the negative electrode falls within the range from 1.1 to 1.8. The passive film may be such formed at a positive electrode potential of 4.1 V (vs. Li/Li$^+$) or more. Alternatively, the passive film may include a region having a ratio F/Al of an emission intensity of fluorine and an emission intensity of aluminum, in which the emission intensities are obtained by radiofrequency glow discharge optical emission spectrometry (GD-OES), that is 0.03 or more. In addition, the region having the ratio F/Al that is 0.03 or more is desirably present within a range of 30 nm or less in depth from the surface of the positive electrode current collector.

In a non-aqueous electrolyte battery that uses a negative electrode including an oxide of titanium and a positive electrode including a nickel-cobalt-manganese composite oxide including lithium, in which a ratio p/n of a capacity p of the positive electrode to a capacity n of the negative electrode falls within a range from 1.1 to 1.8, an upper limit of an operating potential of the positive electrode may be on the order of 3.9 V (vs. Li/Li$^+$). As the result of research, it has been found that when such a nonaqueous electrolyte battery is used in a normal operating voltage range, an adequate protective film, specifically, an adequate passive film is not formed on the positive electrode current collector, and thus an oxidative decomposition reaction of a nonaqueous electrolyte at a surface of the positive electrode current collector is likely to proceed. Furthermore, for that reason, it has been found that the potential of the positive electrode needs to be increased to approximately 4.1 V to 4.2 V (vs. Li/Li$^+$), in order to adequately form a passive film, for example, an AlF$_3$ passive film on the positive electrode current collector including aluminum.

In the nonaqueous electrolyte battery according to the first embodiment, the positive electrode includes a passive film formed by over-charge on the positive electrode current collector. This passive film is formed by over-charge, and is able to have a more sufficient thickness than that formed when the nonaqueous electrolyte battery is used in a normal operating voltage range. The presence of such a passive film allows the nonaqueous electrolyte battery according to the first embodiment to suppress oxidative decomposition of the nonaqueous electrolyte at the surface of the positive electrode current collector including aluminum. As a result, the nonaqueous electrolyte battery according to the first embodiment can exhibit excellent lifetime characteristics.

Furthermore, the nonaqueous electrolyte battery that uses the negative electrode including an oxide of titanium and the positive electrode including a nickel-cobalt-manganese composite oxide including lithium, in which the ratio p/n of the capacity p of the positive electrode to the capacity n of the negative electrode falls within the range from 1.1 to 1.8, can exhibit a sufficiently low OCV.

That is, according to the first embodiment, there can be provided a nonaqueous electrolyte battery that can exhibit a sufficiently low OCV, and at the same time, can exhibit excellent lifetime characteristics.

When the ratio p/n of the capacity p of the positive electrode to the capacity n of the negative electrode is less than 1.1, it becomes difficult to exhibit a sufficiently low OCV. On the other hand, when the ratio p/n exceeds 1.8, the charging condition, in which an adequate passive film is formed, corresponds to a region of excessive over-charge for a nonaqueous electrolyte battery, and adversely affects lifetime characteristics of the nonaqueous electrolyte battery.

The capacity p of the positive electrode herein refers to a positive electrode charging capacity per unit area. The capacity n of the negative electrode refers to a negative electrode charging capacity per unit area.

The oxide of titanium included in the negative electrode is preferably at least one selected from a group consisting of a lithium-titanium composite oxide having a spinel-type structure ($Li_{4+x}Ti_5O_{12}$ (x varies from 0 to 3 depending on the charging/discharging condition)), a lithium-titanium composite oxide having a ramsdellite-type structure ($Li_{2+x}Ti_3O_7$ (x varies from 0 to 2 depending on the state of charge)), a monoclinic titanium dioxide ($TiO_2(B)$), and a monoclinic niobium-titanium composite oxide (for example, $Nb_2TiO_7$). More preferably, the titanium oxide is a lithium-titanium composite oxide having a spinel-type structure.

The lithium-including nickel-cobalt-manganese composite oxide included in the positive electrode is, for example, an active material that can be represented by a general formula $Li_xNi_{1-a-b}Co_aMn_bM_cO_2$. Here, $0.9 < x \leq 1.25$, $0 < a \leq 0.40$, $0 < b \leq 0.40$, $0 \leq c \leq 0.1$, and M represents at least one element selected from among Mg, Al, Si, Ti, Zn, Zr, Ca, and Sn.

The passive film may be formed when the nonaqueous electrolyte battery reaches a state of over-charge, for example, when the positive electrode potential is increased to 4.1 V (vs. Li/Li$^+$). The potential of the positive electrode where the passive film forms preferably falls within a range of 4.1 V (vs. Li/Li$^+$) to 4.3 V (vs. Li/Li$^+$). In other words, the formation of such a passive film on the positive electrode current collector including aluminum, in a nonaqueous electrolyte battery with ratio p/n that falls within a range from 1.1 to 1.8, proves that the nonaqueous electrolyte battery had been over-charged at least once to expose the positive electrode potential to the potential mentioned above.

The passive film preferably includes AlF$_3$. The passive film may also include Al$_2$O$_3$.

Formation of the passive film on the positive electrode current collector can be observed by, for example, a scanning electron microscope (SEM). Furthermore, the composition of the passive film can be identified by use of energy dispersive X-ray spectroscopy (EDX) and radiofrequency glow discharge optical emission spectroscopy (GD-OES) implemented simultaneously with a cross-sectional SEM. Procedures of methods for observation and analysis of the passive film will be described later.

The passive film may be formed on the entire surface of the positive electrode current collector. More specifically, the passive film formed on the positive electrode current collector may be located between the positive electrode current collector and the positive electrode layer.

Next, the nonaqueous electrolyte battery according to the first embodiment will be described in more detail.

The nonaqueous electrolyte battery according to the first embodiment includes a negative electrode, a positive electrode, and a nonaqueous electrolyte.

The negative electrode may include a negative electrode current collector, and a negative electrode layer formed on the negative electrode current collector.

The negative electrode current collector may include a portion that has no negative electrode layer formed on the surface thereof. This portion can function as a negative electrode tab. Alternatively, the negative electrode may also further include a negative electrode tab that is a separate entity from the negative electrode current collector.

The negative electrode layer may include an oxide of titanium as a negative electrode active material. The negative electrode layer may also further include an active material other than the oxide of titanium. The active material other than the oxide of titanium may include, for example, substances that can absorb and release lithium in the range of 0.4 V (vs. Li/Li$^+$) to 1.4 V (vs. Li/Li$^+$). Such substances may include, for example, lithium-including metal nitrides such as a lithium-cobalt nitride, a lithium-nickel nitride, and a lithium-copper nitride.

The negative electrode layer may further include a conductive agent and a binder, if necessary.

The positive electrode may include a positive electrode current collector and a positive electrode layer formed on the positive electrode current collector. The positive electrode current collector may include a portion that has no positive electrode layer formed on the surface thereof. This portion can function as a positive electrode tab. Alternatively, the positive electrode may also further include another positive electrode tab that is a separate entity from the positive electrode current collector.

The positive electrode layer may include, as a positive electrode active material, a nickel-cobalt-manganese composite oxide including lithium. The positive electrode layer may further include a conductive agent and a binder, if necessary.

The positive electrode and the negative electrode can constitute an electrode group. In the electrode group, the positive electrode layer and the negative electrode layer may be opposed to each other interposing, for example, a separator. The electrode group can have various structures. For example, the electrode group may have a stacked structure. The electrode group having the stacked structure can be obtained by stacking, for example, a plurality of positive electrodes and negative electrodes with the separator sandwiched between the positive electrode layer and the negative electrode layer. Alternatively, the electrode group may have a wound structure. The wound electrode group can be obtained, for example, by laminating a separator, a positive electrode, another separator, and a negative electrode in this order to produce a laminate, and winding the laminate so that the negative electrode is positioned outside.

The nonaqueous electrolyte battery may further include a negative electrode terminal and a positive electrode terminal. The negative electrode terminal can function as a conductor for electron transfer between the negative electrode and an external terminal by electrically connecting a part of the negative electrode terminal to a part of the negative electrode. The negative electrode terminal may be connected to, for example, the negative electrode current collector, particularly the negative electrode tab. Similarly, the positive electrode terminal may function as a conductor for electron transfer between the positive electrode and an external circuit by electrically connecting a part of the positive electrode terminal to a part of the positive electrode. The positive electrode terminal may be connected to, for example, the positive electrode current collector, particularly the positive electrode tab.

The nonaqueous electrolyte battery according to the first embodiment may further include a container. The container can house the electrode group and the nonaqueous electrolyte. The electrode group may be impregnated with the nonaqueous electrolyte in the container. A part of the positive electrode terminal and a part of the negative electrode terminal may extend out from the container.

Hereinafter, the negative electrode, the positive electrode, the nonaqueous electrolyte, the separator, the positive electrode terminal, the negative electrode terminal, and the container will be described in more detail.

(1) Negative Electrode

A sheet including a material having high electrical conductivity may be used as the negative electrode current collector. For example, an aluminum foil or an aluminum alloy foil may be used as the negative electrode current collector. When the aluminum foil or the aluminum alloy foil is used, the thickness is, for example, 20 μm or less, and preferably 15 μm or less. The aluminum alloy foil may include one or more of magnesium, zinc, silicon, or the like. The amount of transition metals such as iron, copper, nickel, and chromium included in the aluminum alloy foil is preferably 1% or less.

A negative electrode layer may include negative electrode active material particles including an oxide of titanium. The negative electrode active material particles preferably have an average primary particle size of 5 μm or less. When the average primary particle size is 5 μm or less, an effective area contributing to an electrode reaction can be sufficiently secured. Therefore, good discharge characteristics with a large current can be obtained.

The negative electrode active material may also include a negative electrode active material other than the oxide of titanium. The amount of the oxide of titanium included in the negative electrode active material is preferably 80% by weight or more.

The negative electrode active material particles preferably have a specific surface area of 1 to 10 $m^2/g$. When the specific surface area is 1 $m^2/g$ or greater, an effective area contributing to an electrode reaction is sufficient. Therefore, good discharge characteristics with a large current can be obtained. On the other hand, when the specific surface area is 10 $m^2/g$ or less, a reaction between the negative electrode active material particles and a non-aqueous electrolyte is suppressed. Therefore, decrease of a charge and discharge efficiency and gas generation during storage can be suppressed.

A negative electrode conductive agent is used, if necessary, in order to improve current-collecting performance. Examples of the negative electrode conductive agent include carbon materials. The carbon materials preferably have high adsorption performance of alkali metals and high conductivity. Examples of the carbon materials include acetylene black, carbon black, and graphite.

A negative electrode binder is used in order to bind the negative electrode active material particles and the negative electrode current collector. Examples of the negative electrode binder include polytetrafluoroethylene (PTFE), polyvinylidene fluoride (PVdF), fluororubber, styrene-butadiene rubber (SBR), polypropylene (PP), polyethylene (PE), and carboxymethyl cellulose (CMC).

The proportions of the negative electrode active material, the negative electrode conductive agent, and the negative electrode binder included in the negative electrode layer are preferably 70 to 95% by weight, 0 to 25% by weight, and 2 to 10% by weight, respectively.

The negative electrode can be produced, for example, according to the following procedure. First, a negative electrode active material, a conductive agent, and a binder are mixed into an appropriate solvent, for example, N-methylpyrrolidone, to prepare a slurry. The slurry is applied onto the surface of the negative electrode current collector to form an applied coat, and the applied coat is dried. The negative electrode layer having a desired density is produced by pressing the dried applied coat, and thereby the negative electrode is completed.

(2) Positive Electrode

The positive electrode current collector includes aluminum. As the positive electrode current collector including aluminum, for example, an aluminum foil or an aluminum alloy foil may be used. When the aluminum foil or the aluminum alloy foil is used, the thickness is, for example, 20 μm or less, and preferably 15 μm or less. The aluminum alloy foil may include one or more of magnesium, zinc, silicon, or the like. The amount of transition metals such as iron, copper, nickel, and chromium included in the aluminum alloy foil is preferably 1% or less.

The positive electrode active material may also include a positive electrode active material other than the lithium-including nickel-cobalt-manganese composite oxide. The amount of the lithium-including nickel-cobalt-manganese composite oxide included in the positive electrode active material is preferably 50% by weight or more.

A positive electrode conductive agent is used, if necessary, in order to improve current-collecting performance. Examples of the positive electrode conductive agent include acetylene black, carbon black, and graphite.

A positive electrode binder is used in order to bind the positive electrode active material and the positive electrode current collector. Examples of the positive electrode binder include polytetrafluoroethylene (PTFE), polyvinylidene fluoride (PVdF), fluororubber, styrene-butadiene rubber (SER), polypropylene (PP), polyethylene (PE), and carboxymethyl cellulose (CMC).

The proportions of the positive electrode active material, the positive electrode conductive agent, and the positive electrode binder included in a positive electrode layer are preferably 80 to 95% by weight, 3 to 20% by weight, and 2 to 7% by weight, respectively.

The positive electrode can be produced, for example, according to the following procedure. First, a positive electrode active material, a conductive agent, and a binder are mixed into an appropriate solvent, for example, N-methyl-pyrrolidone, to prepare a slurry. The slurry is applied onto the surface of the positive electrode current collector to form an applied coat, and the applied coat film is dried. The positive electrode layer having a desired density is produced by pressing the dried applied coat, and thereby the positive electrode is completed.

(3) Separator

The separator is made of an insulating material, and can prevent the electrical contact of the positive electrode with the negative electrode. Preferably, the separator is made of a material that allows the nonaqueous electrolyte to pass through, or has a shape that allows the nonaqueous electrolyte to pass through. As an example of the separator, a porous film or a non-woven fabric made of a polymer such as polyolefin, cellulose, polyethylene terephthalate, and vinylon may be used. The separator may be a single type of material, or be a combination of two or more types of materials.

(4) Nonaqueous Electrolyte

The nonaqueous electrolyte may include, for example, a non-aqueous solvent and an electrolyte dissolved in the non-aqueous solvent.

Any known nonaqueous solvent used in nonaqueous electrolyte batteries may be used as the nonaqueous solvent. For example, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), and methyl ethyl carbonate (MEC) can be used as the non-aqueous solvent.

The electrolyte is, for example, an alkali salt, and preferably a lithium salt. Examples of the lithium salt include lithium hexafluorophosphate ($LiPF_6$), lithium hexafluoroarsenate ($LiAsF_6$), lithium perchlorate ($LiClO_4$), and lithium trifluoromethanesulfonate ($LiCF_3SO_3$). Preferably, the electrolyte is lithium hexafluorophosphate ($LiPF_6$). The concentration of the electrolyte in the nonaqueous electrolyte is preferably 0.5 to 2 mol/L.

The concentration of the non-aqueous electrolyte in the nonaqueous electrolyte is preferably 0.5 to 2 mol/L.

The nonaqueous electrolyte may further include additives. As the additives, substances can be used, which they themselves have a reduction potential of 0.5 to 1.4 V (vs. $Li/Li^+$), for example, vinylene carbonate (VC), ethylene sulfite (ES), and fluoroethylene carbonate (FEC), and the like. The additives may be added to the nonaqueous electrolyte such that an amount included would be, for example, 3% by weight.

(5) Negative Electrode Terminal and Positive Electrode Terminal

The negative electrode terminal and the positive electrode terminal are preferably made of a material having high electrical conductivity. These terminals are preferably made of the same material as that of the electrode current collector in order to reduce contact resistance when the terminals are connected to the current collector.

(6) Container

As the container, for example, a metal container or a laminate film container may be used. However, the container is not particularly limited.

A nonaqueous electrolyte battery having excellent impact resistance and long-term reliability can be achieved by using the metal container as the container. The use of the laminate film container as the container can achieve a nonaqueous electrolyte battery having excellent corrosion resistance, and at the same time, the weight of the nonaqueous electrolyte battery can be reduced.

A metal container having a thickness within a range of, for example, 0.2 to 5 mm may be used. The metal container more preferably has a thickness of 0.5 mm or less.

The metal container preferably includes at least one metal selected from the group consisting of Fe, Ni, Cu, Sn, and Al. The metal container may be made of, for example, aluminum, an aluminum alloy, or the like. The aluminum alloy is preferably an alloy including elements such as magnesium, zinc, and silicon. When the alloy includes transition metals such as iron, copper, nickel, and chromium, the amount of these transition metals is preferably 1% by weight or less. Thereby, the long-term reliability and thermal radiation performance under a high temperature environment can be dramatically improved.

A laminate film container having a thickness being within a range of, for example, 0.1 to 2 mm may be used. The thickness of the laminate film is more preferably 0.2 mm or less.

As the laminate film, a multilayer film including a metal layer and resin layers sandwiching the metal layer is used. The metal layer preferably includes at least one metal selected from the group consisting of Fe, Ni, Cu, Sn, and Al. The metal layer is preferably made of an aluminum foil or an aluminum alloy foil in order to obtain a lightweight battery. As the resin layer, a high-molecular material such as polypropylene (PP), polyethylene (PE), nylon, or polyethylene terephthalate (PET) may be used. The laminate film can be molded into the shape of the container by thermally sealing the laminate film.

Examples of the form of the container include a flat form (thin form), a rectangular form, a cylinder form, a coin form, and a button form. The container can have various sizes according to applications. For example, when the nonaqueous electrolyte battery according to the first embodiment is used in the application of a mobile electronic device, the container can be miniaturized according to the size of an electronic device to be mounted. Alternatively, a container for a nonaqueous electrolyte battery to be mounted on two-wheel or four-wheel vehicles or the like may be a container for a large-sized battery.

Next, an example of a nonaqueous electrolyte battery according to an embodiment will be described in more detail with reference to the drawings.

Figure 2:
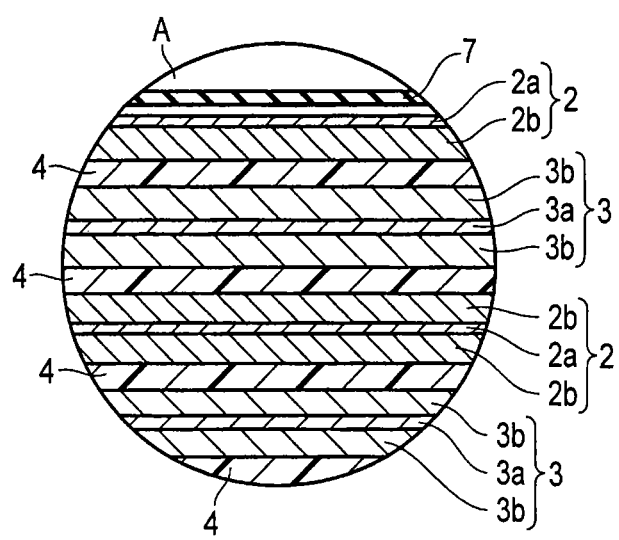
FIG. 2 is an enlarged cross-sectional view of part A in FIG. 1.

FIG. 1 is a partially cut-out perspective view of a nonaqueous electrolyte battery of a first example according to the embodiment. FIG. 2 is an enlarged sectional view of part A of the nonaqueous electrolyte battery shown in FIG. 1.

A nonaqueous electrolyte battery 100 shown in FIGS. 1 and 2 includes a flat electrode group 1.

The flat electrode group 1 includes a negative electrode 2, a positive electrode 3, and a separator 4.

The negative electrode 2 includes a negative electrode current collector 2a and a negative electrode layer 2b supported on the negative electrode current collector 2a, as shown in FIG. 2. The positive electrode 3 includes a positive electrode current collector 3a and a positive electrode layer 3b supported on the positive electrode current collector 3a, as shown in FIG. 2.

In the electrode group 1, as shown in FIG. 2, the negative electrode 2 and the positive electrode 3 are stacked in a state where the separator 4 is sandwiched between the negative electrode layer 2b and the positive electrode layer 3b. The electrode group 1, as such, can be obtained according to the following procedure. First, a plate-like negative electrode 2 and a plate-like positive electrode 3 are laminated together with a separator 4 interposed in between. Next, another separator 4 is stacked onto a positive electrode layer 3b which is not opposed to the negative electrode 2, to produce a laminate. The laminate is wound with the negative electrode 2 on the outside. Then, a winding core is extracted, and the laminate is then pressed into a flat shape. Thus, the electrode group 1 shown in FIGS. 1 and 2 can be obtained.

A belt-like negative electrode terminal 5 is electrically connected to the negative electrode 2. A belt-like positive electrode terminal 6 is electrically connected to the positive electrode 3.

The nonaqueous electrolyte battery 100 shown in FIGS. 1 and 2 further includes a pouch 7 made of a laminate film, as the container.

The electrode group 1 is housed in the pouch 7 made of a laminate film with one end of each of the negative electrode terminal 5 and the positive electrode terminal 6 extending out from the pouch 7. A nonaqueous electrolyte, which is not shown, is housed in the pouch 7 made of a laminate film. The electrode group 1 is impregnated with the nonaqueous electrolyte. The circumference of the pouch 7 is heat-sealed. In this manner, the electrode group 1 and the nonaqueous electrolyte are sealed.

Next, a second example of a nonaqueous electrolyte battery according to a first embodiment will be described in detail with reference to FIG. 3.

Figure 3:
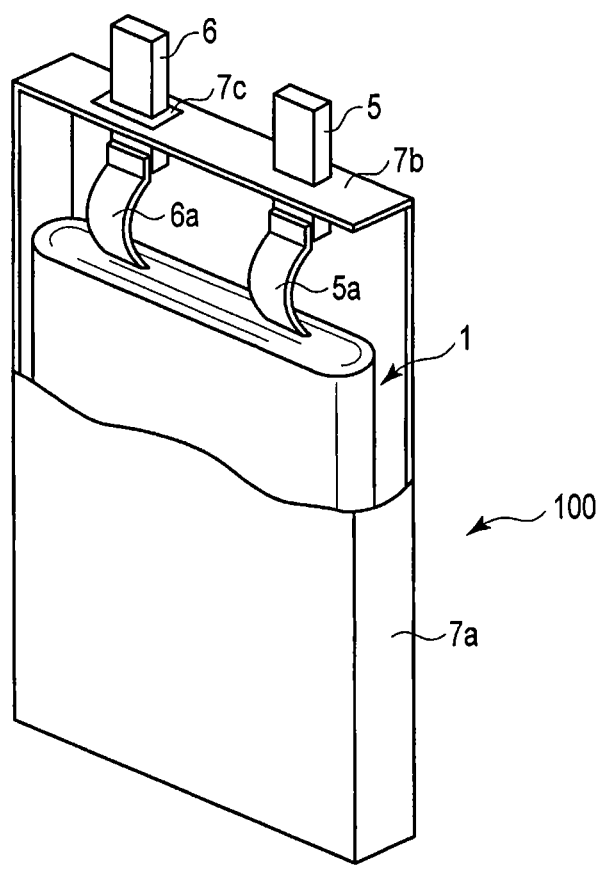
FIG. 3 is a partially cut-out perspective view of a nonaqueous electrolyte battery of a second example according to the first embodiment.

FIG. 3 is a partially cut-out perspective view of the nonaqueous electrolyte battery of the second example according to the first embodiment.

A nonaqueous electrolyte battery 100 shown in FIG. 3 is largely different from the nonaqueous electrolyte battery 100 of the first example in that a container is configured from a metal container 7a and a sealing plate 7b.

The nonaqueous electrolyte battery 100 shown in FIG. 3 includes the same electrode group 1 as the electrode group 1 of the nonaqueous electrolyte battery 100 of the first example. The difference between the first example and the second example lies in a point in that the second example shown in FIG. 3 uses a member 5a, which is used as the negative electrode terminal 5 in the first example, as a negative electrode tab, and a point in that the second example uses a member 6a, which is used as the positive electrode terminal 6 in the first example, as a positive electrode tab.

In the nonaqueous electrolyte battery 100 shown in FIG. 3, the electrode group 1 is housed in the metal container 7a. The metal container 7a further houses a nonaqueous electrolyte, not shown. The metal container 7a is sealed by a metal sealing plate 7b.

The sealing plate 7b includes a negative electrode terminal 5 and a positive electrode terminal 6. An insulating member 7c is interposed between the positive electrode terminal 6 and the sealing plate 7b. Thereby, the positive electrode terminal 6 and the sealing plate 7b are electrically insulated from each other.

The negative electrode terminal 5 is connected to the negative electrode tab 5a as shown in FIG. 3. Similarly, the positive electrode terminal 6 is connected to the positive electrode tab 6a.

(Methods for Observation and Analysis of Passive Film)

(1) Pretreatment

First, a nonaqueous electrolyte battery as a test sample is prepared. Next, the prepared battery is discharged down to the lower voltage limit. Next, the discharged nonaqueous electrolyte battery is opened under an inert atmosphere, and the electrode group is taken out of the battery container.

Next, from the thus taken out electrode group, the positive electrode is taken out. From the thus taken out positive electrode, a positive electrode portion is cut out in an appropriate size (50 mm×50 mm). The positive electrode portion thus cut out is cleaned with, for example, a solvent of ethylmethyl carbonate to remove lithium salt adhering to the positive electrode portion. The cleaned positive electrode portion is dried under reduced pressure to evaporate the residual solvent.

Next, from the dried positive electrode portion, the positive electrode layer including an active material on the surface is removed using a cotton swab impregnated with N-methylpyrrolidone, or the like, to leave only the positive electrode current collector.

Thereafter, the positive electrode current collector, with the positive electrode layer removed using a cotton swab, is immersed in a solvent of N-methylpyrrolidone. Then, this positive electrode current collector is subjected to ultrasonic cleaning for approximately 1 minute in an ultrasonic cleaner. Thus, the residual positive electrode layer on the surface of the positive electrode current collector can be removed.

Thereafter, the solvent is evaporated from the positive electrode current collector in air. Then, a sample of a size required for analysis (approximately 10 mm×10 mm) is cut out from the positive electrode current collector. Next, the sample cut out is immersed in ethanol, and subjected to ultrasonic cleaning for approximately 1 minute in an ultrasonic cleaner. After the cleaning, the sample is dried in air to obtain an analysis sample. The analysis sample includes the positive electrode current collector and a passive film formed on the positive electrode current collector.

(2) Shape Observation and Composition Analysis of Passive Film under Scanning Electron Microscope The analysis sample obtained by the pretreatment described above is processed using ion beams so that a cross section of the sample can be observed. The processed analysis sample is subjected to cross-sectional observation under a scanning electron microscope. The form of the passive film formed on the surface of the positive electrode current collector can be thus observed.

For example, at this time, energy dispersive X-ray spectroscopy (EDX) is implemented simultaneously. In this way, the formation of a passive film can be confirmed according to whether or not a spectrum attributed to fluorine (F) is detected at a portion on the surface of the positive electrode current collector that had been in contact with the positive electrode layer.

Figure 4:
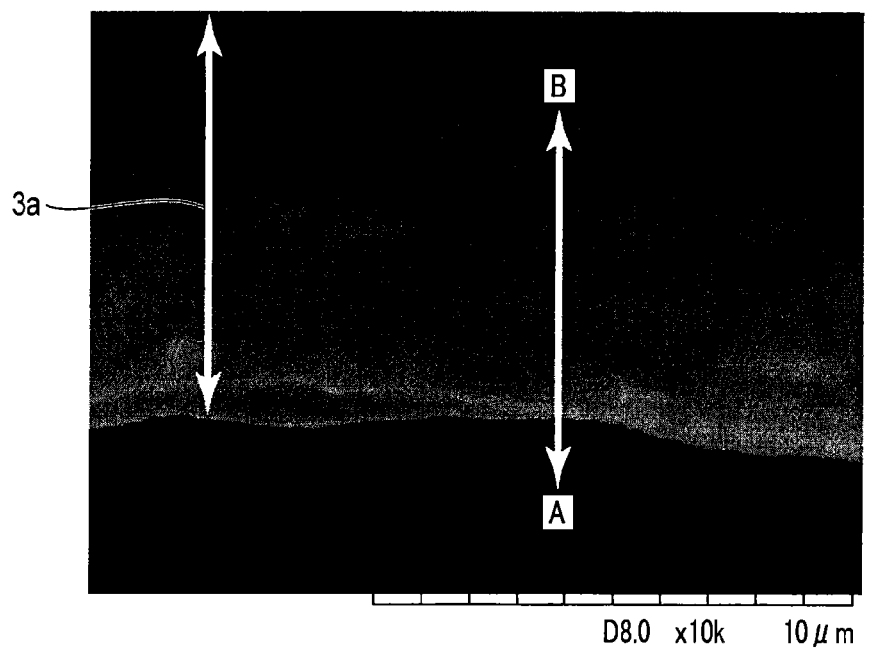
FIG. 4 is a scanning electron microscope (SEM) photograph of a surface of a positive electrode current collector included in a nonaqueous electrolyte battery as an example according to the first embodiment.
Figure 5:
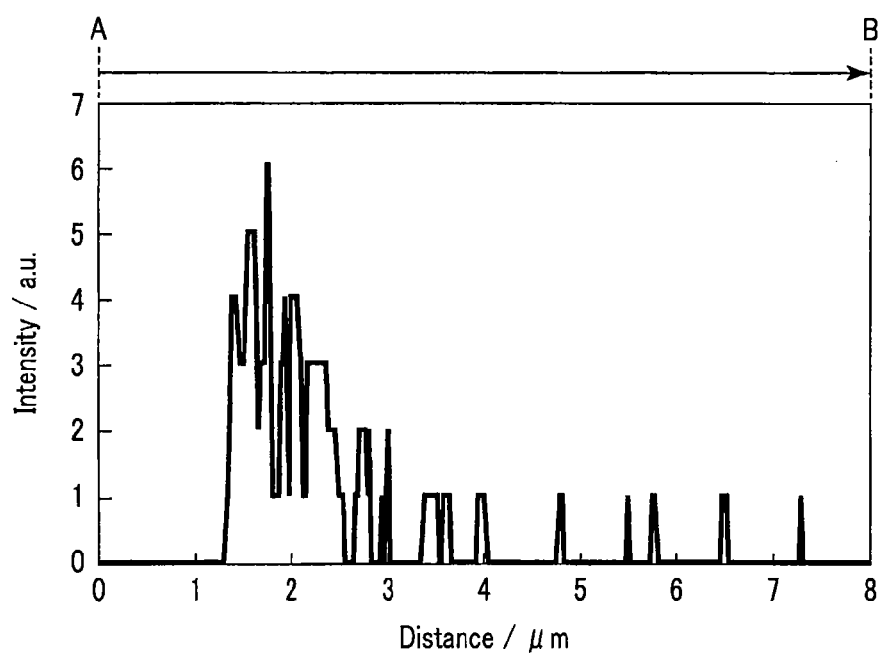
FIG. 5 is a diagram showing a fluorine F distribution obtained as a result of carrying out an energy dispersive X-ray spectroscopy (EDX) analysis from point A to point B in FIG. 4.

FIG. 4 is a scanning electron microscope (SEM) photograph of a surface of a positive electrode current collector included in a nonaqueous electrolyte battery of an example according to the first embodiment. FIG. 5 shows a distribution of fluorine (F) obtained as a result of carrying out an EDX analysis from point A to point B in FIG. 4. The point A in FIG. 4 is a point outside the positive electrode current collector $3a$, and the point B is a point inside the positive electrode current collector $3a$.

From the photograph shown in FIG. 4 and the distribution shown in FIG. 5, it is seen that there are peaks in the distribution of fluorine (F) for the vicinity of the surface of the positive electrode current collector $3a$ including aluminum, located in an upper area of the view in FIG. 4. More specifically, from these results, it can be determined that a passive film including fluorine is formed on the surface of the positive electrode current collector $3a$.

(3) Shape Observation and Composition Analysis of Passive Film by Glow Discharge Optical Emission Spectroscopy (GD-OES)

Figure 8:
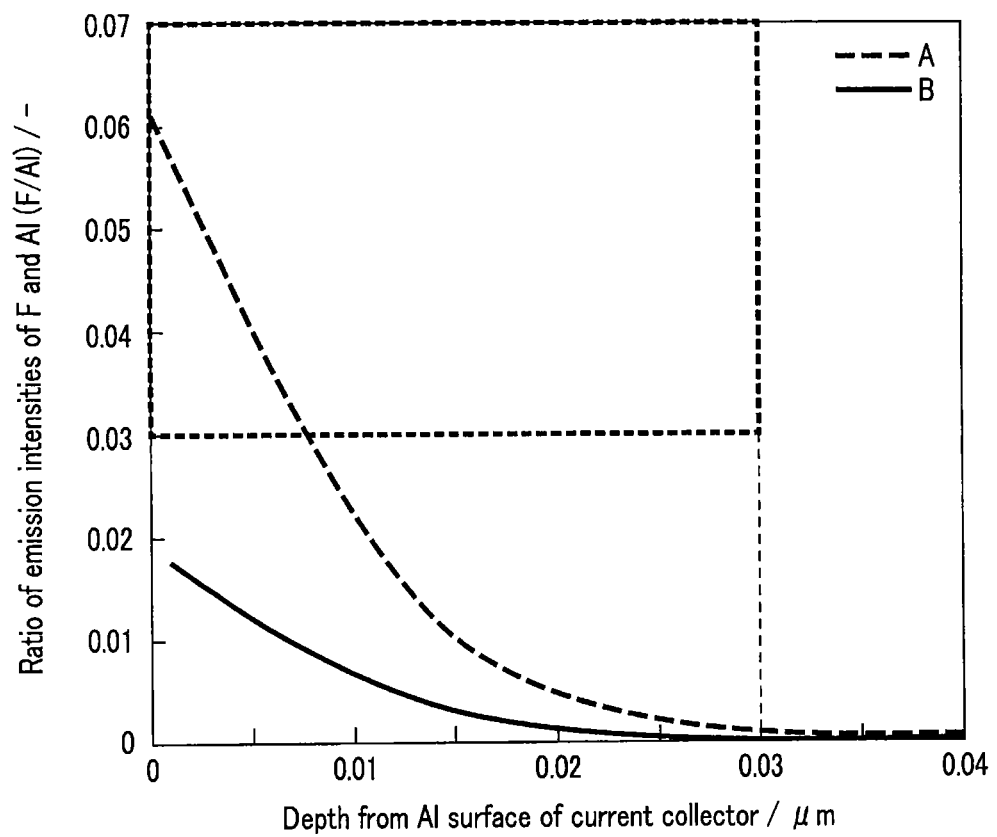
FIG. 8 is a graph showing a ratio F/Al of an emission intensity of fluorine obtained by radiofrequency glow discharge optical emission spectroscopy (GD-OES) to an emission intensity of aluminum obtained by GD-OES with respect to the depth from the surface of a positive electrode current collector included in a nonaqueous electrolyte battery of an example according to the first embodiment.

By subjecting the analysis sample obtained by pretreatment as described in section (1) to an elemental analysis in the depth direction using a glow discharge optical emission spectroscopy (GD-OES) apparatus, the depth and composition of the passive film formed on the surface of the positive electrode current collector can be examined. The quantitative distribution of F (fluorine) in the depth direction at the surface of the positive electrode current collector may be determined by carrying out the analysis. FIG. 8 is a graph showing an example of a measurement result using GD-OES. In FIG. 8, the horizontal axis indicates a depth from the surface of the positive electrode current collector, whereas the vertical axis indicates a value (F/Al) normalized by dividing the emission intensity of F (fluorine) by the emission intensity of Al (aluminum) at the depth, that is, a ratio of emission intensities of F and Al. In FIG. 8, A shows a measurement result for an analysis sample including a positive electrode current collector having a dense passive film formed thereon. B shows a measurement result for an analysis sample including a positive electrode current collector not having an adequate passive film formed thereon.

It can be determined that $AlF_3$ is densely dispersed in a region having F/Al of 0.03 or more. More specifically, in the region having F/Al of 0.03 or more, a dense passive film is formed. However, F/Al is desirably 0.3 or less. As shown in FIG. 8, the positive electrode current collector with a dense passive film formed (A) has a region where F/Al is 0.03 or more. In contrast, the positive electrode current collector without an adequate passive film formed (B) has no region where F/Al is 0.03 or more.

The region having F/Al of 0.03 or more is preferably present in a range at a depth of 30 nm or less from the surface of the current collector. In such a case, the oxidative decomposition reaction of the nonaqueous electrolyte can be suppressed, because the region of the passive film with dense $AlF_3$ is present in the vicinity of the surface of the positive electrode current collector. In addition, F/Al is preferably less than 0.03 in a region at a depth in excess of 30 nm from the surface of the current collector. By having the ratio F/Al be 0.03 or more in a region described as such, the oxidative decomposition reaction of the nonaqueous electrolyte can be suppressed without decreasing the current-collecting performance of the positive electrode current collector.

When the region having F/Al of 0.03 or more spans over a distance in excess of 30 nm in the depth direction of the positive electrode current collector, there is a possibility that $AlF_3$ will serve as a resistance component that interferes with electron conduction between the positive electrode layer and the positive electrode current collector. As just described, an excessively large thickness of the dense passive film increases the electrical resistance of the nonaqueous electrolyte battery, and is therefore unfavorable. Herein, the thickness of the dense passive film is not limited to the thickness from the surface of the current collector.

In addition, the region having F/Al of 0.03 or more preferably spans over a distance of 0.1 nm or more in the depth direction of the positive electrode current collector. That is, the dense $AlF_3$ passive film preferably has a thickness of 0.1 nm or more. The passive film having a thickness of 0.1 nm or more has a sufficient thickness for suppressing the oxidative decomposition of the nonaqueous electrolyte at the positive electrode. When the range that the region with F/Al of 0.03 or more spans is less than 0.1 nm in the depth direction of the positive electrode current collector, the passive film fails to function as a protective film. More specifically, such a passive film has too small a thickness, and therefore unable to suppress the oxidative decomposition reaction of the nonaqueous electrolyte at the positive electrode current collector.

From the foregoing, the region having F/Al of 0.03 or more preferably spans over a distance from 0.1 nm to 30 nm in the depth direction of the positive electrode current collector.

(Method for Measurement of Ratio p/n)

First, a nonaqueous electrolyte battery as a test sample is prepared. Next, the prepared battery is discharged down to the lower voltage limit. Next, the discharged nonaqueous electrolyte battery is opened under an inert atmosphere, and the electrode group is taken out of the battery container.

Next, from the thus taken out electrode group, the positive electrode and the negative electrode are each taken out. From the thus taken out electrodes, electrode portions are cut out in a size (20 mm×20 mm) required for measurement. The electrode portions cut out are cleaned with, for example, a solvent of ethylmethyl carbonate to remove lithium salt to the electrode portions. The cleaned electrode portions are dried under reduced pressure to evaporate the residual solvent.

Next, three-electrode cells using the dried electrode portions as working electrodes and metal Li as a reference electrode and a counter electrode are assembled for each of the positive electrode and negative electrode.

These cells are used to carry out discharge tests in order to measure the capacities of the positive electrode and negative electrode. For the positive electrode, first, the three-electrode cell is discharged to 3.0 V (vs. Li/Li$^+$). Thereafter, the three-electrode cell for the positive electrode is charged to 4.3 V (vs. Li/Li$^+$), and the charging capacity obtained at this time is regarded as a positive electrode charging capacity. For the negative electrode, first, the three-electrode cell is discharged to 2.0 V (vs. Li/Li$^+$). Thereafter, the three-electrode cell is charged to 1.4 V (vs. Li/Li$^+$), and the capacity obtained at this time is regarded as a negative electrode charging capacity. The obtained positive electrode charging capacity and negative electrode charging capacity are divided respectively by the areas of the measurement samples to respectively calculate the positive electrode capacity p (Ah/g) and the negative electrode capacity n (Ah/g). The ratio of the thus obtained positive electrode capacity p to the negative electrode capacity n is regarded as a ratio p/n.

The ratio p/n can be adjusted by, for example, controlling the amounts of slurry applied to the electrode current collectors in the preparation of the positive electrode and negative electrode.

The nonaqueous electrolyte battery according to the first embodiment uses the negative electrode including an oxide of titanium and the positive electrode including a nickel-cobalt-manganese composite oxide including lithium, has the ratio p/n of the capacity p of the positive electrode to the capacity n of the negative electrode within the range from 1.1 to 1.8, and includes the passive film formed on the surface of the positive electrode current collector. The passive film is desirably formed at a positive electrode potential of 4.1 V (vs. Li/Li$^+$) or more. Alternatively, the passive film preferably has a region in which the ratio F/Al of 0.03 or more of the emission intensity of fluorine to the emission intensity of aluminum, obtained by radiofrequency glow discharge optical emission spectroscopy (GD-OES). In addition, the region in which F/Al is 0.03 or more is more desirably present in the range of 30 nm or less in depth from the surface of the positive electrode current collector. By virtue of the foregoing, the nonaqueous electrolyte battery according to the first embodiment can exhibit a sufficiently low OCV and exhibit excellent lifetime characteristics.

Second Embodiment

According to a second embodiment, there is provided a method of manufacturing a nonaqueous electrolyte battery. The method includes: assembling a battery unit; and subjecting the battery unit to over-charge. The battery unit includes a negative electrode including an oxide of titanium, a positive electrode, and a nonaqueous electrolyte. The positive electrode includes a positive electrode current collector including aluminum, and a positive electrode layer formed on the positive electrode current collector and including a nickel-cobaltmanganese composite oxide including lithium. In the battery unit, a ratio p/n of a capacity p of the positive electrode to a capacity n of the negative electrode falls within the range from 1.1 to 1.8.

According to the method according to the second embodiment, the nonaqueous electrolyte battery according to the first embodiment, for example, can be manufactured.

Next, the method for manufacturing a nonaqueous electrolyte battery according to the second embodiment will be described in more detail.

(1) Assembly of Battery Unit

The battery unit assembled herein includes a negative electrode, a positive electrode, and a nonaqueous electrolyte. In addition, the battery unit assembled herein may further include a separator, a negative electrode terminal, a positive electrode terminal, and a container, as in the case of the nonaqueous electrolyte battery according to the first embodiment. The same materials as described in the first embodiment may be used for the materials for each member, for the preparation of the battery unit. The specific assembly method varies depending on details of the battery. For example, the battery unit may be prepared in accordance with the procedure mentioned in the description of the first embodiment.

Here, the ratio p/n of the capacity p of the positive electrode to the capacity n of the negative electrode is adjusted to fall within the range from 1.1 to 1.8. As described previously, the ratio p/n can be adjusted by, for example, controlling the amounts of slurry applied to the electrode current collectors in the preparation of the positive electrode and negative electrode. In addition, this ratio p/n can be determined by the method described in the first embodiment.

The method for subsequent subjection of the nonaqueous electrolyte battery to over-charge varies depending on the value of the ratio p/n.

(2) Over-Charge of Battery Unit

The battery unit manufactured as described above is subjected to over-charge. The over-charge may be carried out in the initial charge, or the over-charge may be carried out after the initial charge. This over-charge can form a passive film on the surface of the positive electrode current collector including aluminum.

Herein, the battery unit over-charge means charge carried out so that the potential of the positive electrode is 4.1 V (vs. Li/Li$^+$) or more.

In this over-charge, as described below, the treatment required differs, depending on the value of the ratio p/n of the battery unit.

(A) In the case of $1.1 \leq p/n \leq 1.2$:

In the case that the ratio p/n is from 1.1 to 1.2, the positive electrode potential can be increased to 4.1 V (vs. Li/Li$^+$) without causing any serious problems without having to adopt any special measure. However, the application of the following treatment can prevent the negative electrode potential from excessively decreasing due to over-charge. For example, the negative electrode layer may include a substance that can absorb and release lithium ions in the range of 0.4 V (vs. Li/Li$^+$) to 1.4 V (vs. Li/Li$^+$) as described in the first embodiment. Alternatively, the nonaqueous electrolyte may include an additive, such as, for example, vinylene carbonate (VC), ethylene sulfite (ES), and fluoroethylene carbonate (FEC). Alternatively, both treatments may be applied. Excessive decrease of the negative electrode potential can be prevented f to thereby prevent the negative electrode current collector from being deteriorated.

For example, in the case that the ratio p/n is from 1.1 to 1.2, the potential of the positive electrode can be increased to 4.1 V (vs. Li/Li$^+$) by charging the battery unit at a rate of 1 C to a state of charge SOC that is 110% of the nominal capacity.

(B) In the case of $1.2 < p/n \leq 1.8$:

When the ratio p/n is more than 1.2, and equal to or less than 1.8, there is a possibility that the negative electrode potential will become excessively decreased due to increasing of the positive electrode potential to 4.1 V (vs. Li/Li$^+$), if no measure is adopted. When the negative electrode potential decreases excessively, for example, in a case that the negative electrode current collector includes aluminum, the aluminum included in the negative electrode current collector forms alloys with lithium. More specifically, Li-Al alloy formation reactions take place on the negative electrode current collector, and thereby deteriorate the negative electrode current collector.

Therefore, when the ratio p/n is more than 1.2, and equal to or less than 1.8, a substance that can absorb and release lithium ions in the range of 0.4 V (Li/Li$^+$) to 1.4 V (Li/Li$^+$) as described in the first embodiment is included in the negative electrode. Alternatively, an additive, such as, for example, vinylene carbonate (VC), ethylene sulfite (ES), and fluoroethylene carbonate (FEC) is included in the nonaqueous electrolyte. Alternatively, both treatments may be applied. By this treatment, the negative electrode potential can be prevented from becoming excessively decreased, even when the positive electrode potential is increased to 4.1 V (vs. Li/Li$^+$).

For example, when the ratio p/n is more than 1.2, and equal to or less than 1.8, the potential of the positive electrode can be increased to 4.1 V (vs. Li/Li$^+$) by charging the battery unit at a rate of 1 C to a state of charge SOC that is 130% of the nominal capacity.

(3) Initial Preparation of Nonaqueous Electrolyte Battery

After the battery is subjected to over-charge, the nonaqueous electrolyte battery can be subjected to initial preparation as follows, for example.

After the over-charge, the battery unit is left at 25° C. for 30 minutes with the unit kept in the state of over-charge. Thereafter, the unit can be discharged at a rate of 1 C to 100% or less of the nominal capacity. These procedures together constitute the initial preparation.

According to the method for manufacturing a nonaqueous electrolyte battery according to the second embodiment, the nonaqueous electrolyte battery according to the first embodiment can be manufactured. Accordingly, the method for manufacturing a nonaqueous electrolyte battery according to the second embodiment can manufacture a nonaqueous electrolyte battery which can exhibit a sufficiently low OCV, and at the same time exhibit excellent lifetime characteristics.

Third Embodiment

According to a third embodiment a battery pack is provided. The battery pack includes the nonaqueous electrolyte battery according to the first embodiment.

The battery pack according to the third embodiment may include a plurality of nonaqueous electrolyte batteries. The plurality of nonaqueous electrolyte batteries may be electrically connected in series, or may be electrically connected in parallel. Alternatively, the plurality of nonaqueous electrolyte batteries may also be connected in a combination of a connection in series and a connection in parallel.

For example, the battery pack according to the third embodiment may include six of the nonaqueous electrolyte batteries according to the first embodiment. These nonaqueous electrolyte batteries may be connected in series. The nonaqueous electrolyte batteries connected in series can constitute a battery module. That is, the battery pack according to the third embodiment may include a battery module.

The battery pack according to the third embodiment may include a plurality of battery modules. The plurality of battery modules may be connected in series, in parallel, or in a combination of a connection in series and a connection in parallel.

Hereinafter, an example of the battery pack according to the third embodiment will be described with reference to FIGS. 6 and 7.

Figure 6:
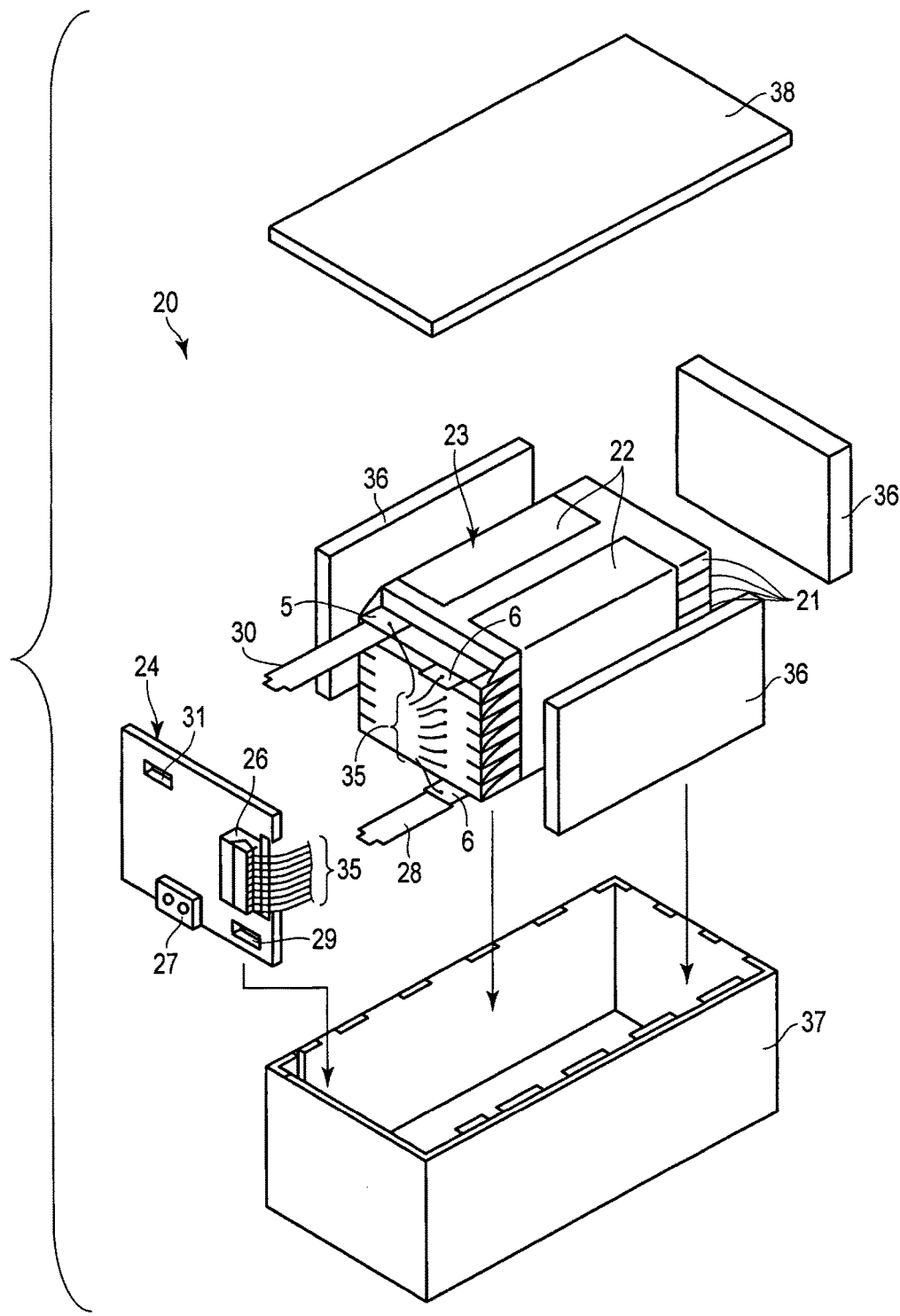
FIG. 6 is an exploded perspective view of a battery pack as an example according to a third embodiment.

FIG. 6 is an exploded perspective view of a battery pack of an example according to the third embodiment. FIG. 7 is a block diagram showing an electric circuit of the battery pack of FIG. 6.

Figure 7:
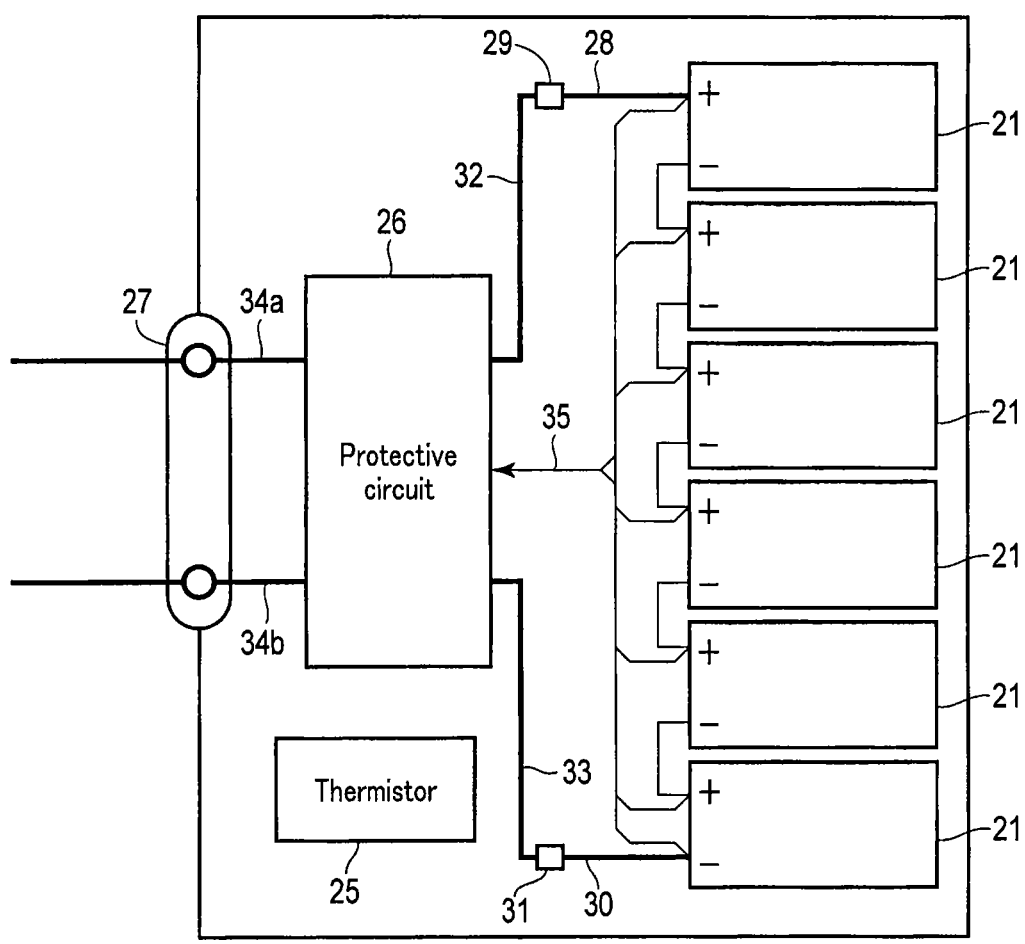
FIG. 7 is a block diagram illustrating an electrical circuit of the battery pack shown in FIG. 6.

A battery pack 20 shown in FIGS. 6 and 7 includes a plurality of unit cells 21. The unit cell 21 is the flat nonaqueous electrolyte battery 100 of an example according to the first embodiment described with reference to FIG. 3.

The plurality of unit cells 21 are stacked so that a negative electrode terminal 5 and a positive electrode terminal 6, which extend out of the container, are aligned in the same direction, and the unit cells 21 are bound by an adhesive tape 22 to constitute a battery module 23. As shown in FIG. 7, the unit cells 21 are electrically connected in series with one another.

A printed wiring board 24 is arranged opposite to the side surface of the unit cell 21 from which the negative electrode terminal 5 and the positive electrode terminal 6 extend. As shown in FIG. 7, a thermistor 25, a protective circuit 26, and a conducting terminal 27 that conducts electricity to external devices are mounted on the printed wiring board 24. An insulating plate (not shown) is attached to the surface of the printed wiring board 24 facing the battery module 23 to avoid unnecessary connection with the wiring of the battery module 23.

A positive electrode lead 28 is connected to the positive electrode terminal 6 positioned on the lowermost layer of the battery module 23, and one end of the positive electrode lead 28 is inserted into and electrically connected to a positive electrode connector 29 of the printed wiring board 24. A negative electrode lead 30 is connected to the negative electrode terminal 5 positioned on the uppermost layer of the battery module 23, and one end of the negative electrode lead 30 is inserted into and electrically connected to a negative electrode connector 31 of the printed wiring board 24. These connectors 29 and 31 are connected to the protective circuit 26 through wirings 32 and 33 formed on the printed wiring board 24.

The thermistor 25 is used to detect a temperature of the unit cell 21, and detection signals are transmitted to the protective circuit 26. The protective circuit 26 can shut off a positive-side wiring 34a and a negative-side wiring 34b between the protective circuit 26 and the conductive terminal 27, under a predetermined condition. An example of a predetermined condition is when the temperature detected by the thermistor 25 is a predetermined temperature or higher, for example. Also, another example of a predetermined condition is when an over-charge, over-discharge, over-current, or the like of the unit cell 21 is detected, for example. The detecting of the over-charge or the like is performed for individual unit cells 21 or the entire battery module 23 as a whole. When detecting is performed for individual unit cells 21, detecting may be performed with regards to a battery voltage, or detecting may be performed with regards to a positive electrode potential or a negative electrode potential. In the latter case, a lithium electrode is inserted in each individual unit cell 21 as a reference electrode. In the case of the battery pack 20 in FIGS. 6 and 7, a wiring 35 for detecting voltage is connected to each unit cell 21. Detection signals are transmitted to the protective circuit 26 through these wirings 35.

A protective sheet 36 made of rubber or resin is arranged on each of the three side surfaces of the battery module 23 excluding the side surface from which the positive electrode terminal 6 and the negative electrode terminal 5 project.

The battery module 23 is housed in a housing container 37 together with each of the protective sheets 36 and printed wiring board 24. More specifically, each of the protective sheets 36 are arranged on both inside surfaces along a long-side direction and on one of the inside surfaces along a short-side direction of the housing container 37, and the printed wiring board 24 is arranged on an inside surface opposite to the protective sheet 36 that is arranged along the short-side direction. The battery module 23 is positioned in a space enclosed by the protective sheets 36 and the printed wiring board 24. A cover 38 is mounted on an upper side of the housing container 37.

A heat-shrinkage tape may be used in place of the adhesive tape 22 to secure the battery module 23. In this case, after the protective sheet is arranged on both sides of the battery module and the heat-shrinkage tape is wound around the battery module and protective sheets, the heat-shrinkage tape is contracted by heating to fasten the battery module together.

A configuration in which the unit cells 21 are connected in series is shown in FIGS. 6 and 7. However, these unit cells may be connected in parallel to increase the capacity of the battery. The assembled battery packs may be connected in series, in parallel, or both in series and in parallel, also.

Embodiments of the battery pack according to the third embodiment are appropriately changed depending on applications. Preferable applications of the battery pack according to the third embodiment are those in which favorable cycle characteristics at large current are desired. Specific examples of the applications include power sources for digital cameras, and power sources mounted on vehicles such as two to four-wheeled hybrid electric cars, two to four-wheeled electric cars, and assist bicycles. The battery pack according to the third embodiment is particularly preferably used for power sources mounted on vehicles.

The battery pack according to the third embodiment includes the nonaqueous electrolyte battery according to the first embodiment, and thus can exhibit a sufficiently low OCV, and at the same time exhibit excellent lifetime characteristics.

EXAMPLES

Examples will be described below, but the present invention is not limited to the examples described below, so long as the present invention does not deviate from the scope and spirit thereof.

Example 1

In Example 1, a nonaqueous electrolyte battery was prepared in accordance with the following procedure.

[Preparation of Positive Electrode]

Prepared were a lithium-nickel-cobalt-manganese composite oxide $LiNiCoMnO_2$ as a positive electrode active material, acetylene black as a first conductive agent, graphite as a second conductive agent, and polyvinylidene fluoride as a binder. These were mixed at 87:5:3:5 in ratio by weight along with N-methylpyrrolidone as a solvent to obtain positive electrode slurry.

The slurry obtained in the way described above was uniformly applied onto a positive electrode current collector as strip-shaped aluminum foil, while an uncoated portion was partially left. It is to be noted that the amount of the positive electrode slurry applied was adjusted so that the ratio p/n of a charge capacity per unit area of the positive electrode to a charge capacity per unit area of the negative electrode was 1.7. Thereafter, the applied slurry was dried, and then subjected to rolling press to form a positive electrode layer. Then, the positive electrode current collector and the positive electrode layer formed thereon were cut into a desired size.

In this way, a positive electrode was obtained, including the positive electrode current collector and the positive electrode layer formed on the positive electrode current collector.

A positive electrode terminal made from aluminum was welded by ultrasonic welding to the slurry uncoated portion of the obtained positive electrode.

[Preparation of Negative Electrode]

Prepared were lithium titanate $Li_4Ti_5O_{12}$ as a negative electrode active material, graphite as a conductive agent, and polyvinylidene fluoride as a binder. These were dispersed and mixed at 85:10:5 in ratio by weight in N-methylpyrrolidone as a solvent to obtain negative electrode slurry.

The slurry obtained in the way described above was uniformly applied onto a negative electrode current collector as strip-shaped aluminum foil, while an uncoated portion was partially left. It is to be noted that the amount of the negative electrode coating material applied was adjusted so that the ratio p/n of a charge capacity per unit area of the positive electrode to a charge capacity per unit area of the negative electrode was 1.7. Thereafter, the applied slurry was dried, and then subjected to rolling press to form a negative electrode layer. Then, the negative electrode current collector and the negative electrode layer formed thereon were cut into a desired size.

In this way, a negative electrode was obtained, including the negative electrode current collector and the negative electrode layer formed on the negative electrode current collector.

A negative electrode terminal made from aluminum was welded by ultrasonic welding to the slurry uncoated portion of the obtained negative electrode.

[Preparation of Electrode Group]

Next, two separators of polyethylene resin were prepared. Next, the separator, the positive electrode, the separator, and the negative electrode were stacked in this order to form a laminate. Then, the thus obtained laminate was spirally wound so that the negative electrode was located outermost, and then heat pressed after pulling out the roll core. In this way, the wound electrode group was prepared.

[Preparation of Nonaqueous Electrolyte]

Next, a nonaqueous electrolyte was prepared. Ethylene carbonate and propylene carbonate mixed at a volume ratio of 1:2 were used as a non-aqueous solvent. In this non-aqueous solvent, $LiPF_6$ was dissolved as an electrolyte so as to be 1.0 mol/L. Furthermore, vinylene carbonate (VC) was dissolved as an additive so as to be 3% by weight. In this way, the nonaqueous electrolyte was prepared.

[Assembly of Battery Unit]

The electrode group prepared in the way described above was put in a container of laminate film. In this regard, a part of the positive electrode terminal and a part of the negative electrode terminal were projected outside the container.

Then, the previously prepared nonaqueous electrolyte was injected into the container. Thereafter, the container was sealed to obtain a battery unit.

[Initial Charge]

The assembled battery unit was initially charged at a rate of 1 C to 130% of the nominal capacity. The positive electrode potential of the charged battery unit was 4.1 V (vs. $Li/Li^+$). Then, the battery unit was left as it was at 25° C. for 30 minutes. Thereafter, the unit was discharged at 1 C to 100% or less of the nominal capacity, and this operation was regarded as battery initial preparation. In this way, the nonaqueous electrolyte battery according to Example 1 was obtained.

[OCV at SOC of 50%]

The nonaqueous electrolyte battery according to Example 1 was adjusted to 50% of the nominal capacity under an environment at 25° C., and left for 1 hour. The open-circuit voltage in this case was defined as the OCV at the SOC of 50%. The OCV of the nonaqueous electrolyte battery according to Example 1 was 2.17 V.

[Observation of Surface of Positive Electrode Current Collector]

The formation of a dense passive film of $AlF_3$ on the surface of the positive electrode current collector has been determined by observing the surface of the positive electrode current collector of the initially charged nonaqueous electrolyte battery according to Example 1 in accordance with the described procedure. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector. In addition, the maximum value of the emission intensity ratio F/Al was 0.057 in a region in the range from the surface of the positive electrode current collector to a depth of 30 nm.

Example 2

In Example 2, a nonaqueous electrolyte battery according to Example 2 was prepared in the same way as in Example 1, except that the applied amount of the slurry was adjusted so that the ratio p/n was 1.20 in the preparation of the positive electrode and negative electrode, the nonaqueous electrolyte was prepared in the following way, and the initial charge was conducted at a rate of 1 C to 105% of the nominal capacity. The positive electrode potential of the initially charged battery unit was 4.1 V (vs. Li/Li$^+$).

In Example 2, ethylene carbonate and propylene carbonate mixed at a volume ratio of 1:2 were used as a nonaqueous solvent. $LiPF_6$ dissolved as an electrolyte in this nonaqueous solvent so as to be 1.0 mol/L was regarded as the nonaqueous electrolyte.

The OCV of the nonaqueous electrolyte battery according to Example 2 at SOC of 50% was measured in the same way as in Example 1. As a result, the OCV of the nonaqueous electrolyte battery according to Example 2 was 2.24 V at the SOC of 50%.

The formation of a dense passive film of $AlF_3$ on the surface of the positive electrode current collector has been determined by observing the surface of the positive electrode current collector of the initially charged nonaqueous electrolyte battery according to Example 2 in accordance with the described procedure. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector. In addition, the maximum value of the emission intensity ratio F/Al was 0.057 in a region in the range from the surface of the positive electrode current collector to a depth of 30 nm.

Example 3

In Example 3, a nonaqueous electrolyte battery according to Example 3 was prepared in the same way as in Example 1, except that the applied amount of the slurry was adjusted so that the ratio p/n was 1.60 in the preparation of the positive electrode and negative electrode, and the initial charge was conducted at a rate of 1 C to 100% of the nominal capacity. The positive electrode potential of the initially charged battery unit was 4.1 V (vs. Li/Li$^+$).

The OCV of the nonaqueous electrolyte battery according to Example 3 at SOC of 50% was measured in the same way as in Example 1. As a result, the OCV of the nonaqueous electrolyte battery according to Example 3 was 2.18 V at the SOC of 50%.

The formation of a dense passive film of $AlF_3$ on the surface of the positive electrode current collector has been determined by observing the surface of the positive electrode current collector of the initially charged nonaqueous electrolyte battery according to Example 3 in accordance with the described procedure. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector. In addition, the maximum value of the emission intensity ratio F/Al was 0.057 in a region in the range from the surface of the positive electrode current collector to a depth of 30 nm.

Comparative Example 1

In Comparative Example 1, a nonaqueous electrolyte battery according to Comparative Example 1 was prepared in the same way as in Example 2, except that the applied amount of the slurry was adjusted so that the ratio p/n was 1.60 in the preparation of the positive electrode and negative electrode, and the initial charge was conducted at a rate of 1 C to 115% of the nominal capacity.

In Comparative Example 1, the positive electrode potential failed to reach 4.1 V (vs. Li/Li$^+$), although the initial charge was conducted to 115% of the nominal capacity. Specifically, the positive electrode potential of the initially charged battery unit according to Comparative Example 1 was 3.9 V (vs. Li/Li$^+$).

The OCV of the nonaqueous electrolyte battery according to Comparative Example 1 at SOC of 50% was measured in the same way as in Example 1. As a result, the OCV of the nonaqueous electrolyte battery according to Comparative Example 1 was 2.18 V at the SOC of 50%. In addition, when a GD-OES analysis in the depth direction of the positive electrode current collector was carried out, the maximum value of the emission intensity ratio F/Al was 0.017 in a region in the range from the surface of the positive electrode current collector to a depth of 30 nm. From the foregoing, it has been determined that no dense fluorine-including passive film is formed in Comparative Example 1.

Comparative Example 2

In Comparative Example 2, a nonaqueous electrolyte battery according to Comparative Example 2 was prepared in the same way as in Example 2, except that the applied amount of the slurry was adjusted so that the ratio p/n was 1.90 in the preparation of the positive electrode and negative electrode, and the initial charge was conducted at a rate of 1 C to 130% of the nominal capacity.

In Comparative Example 2, the positive electrode potential failed to reach 4.1 V (vs. Li/Li$^+$), although the initial charge was conducted to 130% of the nominal capacity. Specifically, the positive electrode potential of the initially charged battery unit according to Comparative Example 2 was 3.9 V (vs. Li/Li$^+$).

The OCV of the nonaqueous electrolyte battery according to Comparative Example 2 at SOC of 50% was measured in the same way as in Example 1. As a result, the OCV of the nonaqueous electrolyte battery according to Comparative Example 2 was 2.15 V at the SOC of 50%. In addition, when a GD-OES analysis in the depth direction of the positive electrode current collector was carried, the maximum value of the emission intensity ratio F/Al was 0.017 in a region in the range from the surface of the positive electrode current collector to a depth of 30 nm. From the foregoing, it has been determined that no dense fluorine-including passive film region is formed in Comparative Example 2.

Comparative Example 3

In Comparative Example 3, a nonaqueous electrolyte battery according to Comparative Example 3 was prepared in the same way as in Example 2, except that the applied amount of the slurry was adjusted so that the ratio p/n was 1.00 in the preparation of the positive electrode and negative electrode, and the initial charge was conducted at a rate of 1 C to 100% of the nominal capacity.

In Comparative Example 3, the positive electrode potential reached 4.1 V (vs. Li/Li$^+$) or more by the initial charge to 100% of the nominal capacity. Specifically, the positive electrode potential of the initially charged battery unit according to Comparative Example 3 was 4.3 V (vs. Li/Li$^+$).

The OCV of the nonaqueous electrolyte battery according to Comparative Example 3 at SOC of 50% was measured in the same way as in Example 1. As a result, the OCV of the nonaqueous electrolyte battery according to Comparative Example 3 was 2.32 V at the SOC of 50%. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector.

Comparative Example 4

In Comparative Example 4, a nonaqueous electrolyte battery according to Comparative Example 4 was prepared in the same way as in Example 2, except that the applied amount of the slurry was adjusted so that the ratio p/n was 1.90 in the preparation of the positive electrode and negative electrode, and the initial charge was conducted at a rate of 1 C to 150% of the nominal capacity. The positive electrode potential of the initially charged battery unit was 4.1 V (vs. Li/Li$^+$). In addition, the discharge capacity of the battery unit was decreased down to 20% of the nominal capacity in the discharge after leaving the initially charged battery unit at 25° C. for 30 minutes.

The OCV of the nonaqueous electrolyte battery according to Comparative Example 4 at SOC of 50% was measured in the same way as in Example 1. As a result, the OCV of the nonaqueous electrolyte battery according to Comparative Example 4 was 2.15 V at the SOC of 50%. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector. In addition, the maximum value of the emission intensity ratio F/Al was 0.057 in a region in the range from the surface of the positive electrode current collector to a depth of 30 nm.

Comparative Example 5

In Comparative Example 5, a nonaqueous electrolyte battery according to Comparative Example 4 was prepared in the same way as in Example 2, except that the applied amount of the slurry was adjusted so that the ratio p/n was 1.0 in the preparation of the positive electrode and negative electrode, and the initial charge was conducted at a rate of 1 C to 80% of the nominal capacity. The positive electrode potential of the initially charged battery unit was 4.1 V (vs. Li/Li$^+$).

The OCV of the nonaqueous electrolyte battery according to Comparative Example 5 at SOC of 50% was measured in the same way as in Example 1. As a result, the OCV of the nonaqueous electrolyte battery according to Comparative Example 5 was 2.32 V at the SOC of 50%. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector. In addition, the maximum value of the emission intensity ratio F/Al was 0.057 in a region in the range from the surface of the positive electrode current collector to a depth of 30 nm.

Comparative Example 6

In Comparative Example 6, a nonaqueous electrolyte battery according to Comparative Example 6 was prepared in the same way as in Example 1, except that the initial charge was conducted at a rate of 1 C to 100% of the nominal capacity. The positive electrode potential of the initially charged battery unit was 3.9 V (vs. Li/Li$^+$)

The OCV of the nonaqueous electrolyte battery according to Comparative Example 6 at SOC of 50% was measured in the same way as in Example 1. As a result, the OCV of the nonaqueous electrolyte battery according to Comparative Example 6 was 2.17 V at the SOC of 50%. In addition, when a GD-OES analysis in the depth direction of the positive electrode current collector was carried out, the maximum value of the emission intensity ratio F/Al was 0.017 in a region in the range from the surface of the positive electrode current collector to a depth of 30 nm. From the foregoing, it has been determined that no dense fluorine-including passive film region is formed in Comparative Example 6.

Comparative Example 7

In Comparative Example 7, a nonaqueous electrolyte battery according to Comparative Example 7 was prepared in the same way as in Example 1, except that the initial charge was conducted at a rate of 1 C to 170% of the nominal capacity. The positive electrode potential of the initially charged battery unit was 4.3 V (vs. Li/Li$^+$). In addition, the discharge capacity of the battery unit was decreased down to 10% of the nominal capacity in the discharge after leaving the initially charged battery unit at 25° C. for 30 minutes.

The OCV of the nonaqueous electrolyte battery according to Comparative Example 7 at SOC of 50% was measured in the same way as in Example 1. As a result, the OCV of the nonaqueous electrolyte battery according to Comparative Example 7 was 2.17 V at the SOC of 50%. In addition, the formation of a dense fluorine-including passive film with an emission intensity ratio F/Al of 0.03 or more to a depth of 8 nm from the surface of the positive electrode current collector has been determined by carrying out the GD-OES analysis in the depth direction of the positive electrode current collector.

Comparative Example 8

In Comparative Example 8, a nonaqueous electrolyte battery according to Comparative Example 8 was prepared in the same way as in Example 1, except that the initial adjustment of the battery was made in the following way. In the initial adjustment according to Comparative Example 8, first, the battery unit was initially charged. The positive electrode potential of the initially charged battery unit was 4.1 V (vs. Li/Li$^+$). Then, the battery unit was left as it was at 25° C. for 1 minute. Thereafter, the battery was discharged at 1 C to 100% or less of the nominal capacity.

The OCV of the nonaqueous electrolyte battery according to Comparative Example 8 at SOC of 50% was measured in the same way as in Example 1. As a result, the OCV of the nonaqueous electrolyte battery according to Comparative Example 8 was 2.17 V at the SOC of 50%. In addition, when a GD-OES analysis in the depth direction of the positive electrode current collector was carried out, the maximum value of the emission intensity ratio F/Al was 0.017 in a region in the range from the surface of the positive electrode current collector to a depth of 30 nm. From the foregoing, it has been determined that no dense fluorine-including passive film is formed in Comparative Example 8.

[High-Temperature Storage Test]

For the nonaqueous electrolyte batteries according to Examples 1 and 3 as well as Comparative Examples 1 to 8, the initial resistance at the SOC of 50% was measured at 25° C. Furthermore, these nonaqueous electrolyte batteries were charged to a state of charge (SOC 100%), and in the state, stored for 70 days under an environment at 70° C. The resistance value was measured for each nonaqueous electrolyte battery after the storage to confirm the rate of resistance increase relative to the initial resistance. Table 3 below summarizes the rate of resistance increase after the high-temperature storage, for the nonaqueous electrolyte batteries according to Examples 1 to 3 and Comparative Examples 1 to 8. From the results of the high-temperature storage test, it has been determined that Examples 1 to 3 are lower in rate of resistance increase than Comparative Examples 1 to 3 and 5 to 8. The rate of resistance increase in Comparative Example 4 was comparable to the rates of resistance increase in Examples 1 to 3.

[Result]

Tables 1 and 2 below again show the OCV at the SOC of 50% for the nonaqueous electrolyte batteries according to Examples 1 and 3 as well as Comparative Examples 1 to 8, along with some of manufacturing conditions for the batteries.

TABLE 1

| | Ratio p/n | Whether charging up to 4.1 V (vs. Li/Li$^+$) of positive electrode potential had been performed or not | OCV at SOC of 50% (V) |
|---|---|---|---|
| Example 1 | 1.70 | Yes | 2.17 |
| Example 2 | 1.20 | Yes | 2.24 |
| Comparative Example 1 | 1.60 | No | 2.18 |
| Comparative Example 2 | 1.90 | No | 2.15 |
| Comparative Example 3 | 1.00 | Yes | 2.32 |

TABLE 2

| | Ratio p/n | Whether charging up to 4.1 V (vs. Li/Li$^+$) of positive electrode potential had been performed or not | OCV at SOC of 50% (V) |
|---|---|---|---|
| Example 3 | 1.60 | Yes | 2.18 |
| Comparative Example 4 | 1.90 | Yes | 2.15 |
| Comparative Example 5 | 1.00 | Yes | 2.32 |
| Comparative Example 6 | 1.70 | No | 2.17 |
| Comparative Example 7 | 1.70 | Yes | 2.17 |
| Comparative Example 8 | 1.70 | Yes | 2.17 |

TABLE 3

| | Rate of resistance increase after the high-temperature storage (%) |
|---|---|
| Example 1 | 20 |
| Example 2 | 25 |
| Example 3 | 20 |
| Comparative Example 1 | 45 |
| Comparative Example 2 | 40 |
| Comparative Example 3 | 90 |
| Comparative Example 4 | 20 |
| Comparative Example 5 | 90 |
| Comparative Example 6 | 40 |
| Comparative Example 7 | 35 |
| Comparative Example 8 | 40 |

From the results in Table 1 and the described results of the high-temperature storage test, it is determined that the nonaqueous electrolyte batteries according to Examples 1 to 3 have succeeded in exhibiting a low OCV at the SOC of 50%, and suppressing the increase in resistance after the high-temperature storage.

On the other hand, the nonaqueous electrolyte batteries according to Comparative Examples 1 and 2 have succeeded in exhibiting a low OCV at the SOC of 50%, but failed to suppress the increase in resistance after the high-temperature storage. This is believed to be because the high-temperature storage caused an oxidative decomposition reaction of the nonaqueous electrolyte at the surface of the positive electrode current collector, and the product generated by the oxidative decomposition reaction which causes an increase in resistance in Comparative Examples 1 and 2. In addition, the nonaqueous electrolyte according to Comparative Example 3 was 1.0 in ratio p/n, and thus higher in OCV than the nonaqueous electrolyte batteries according to Examples 1 to 3. In addition, in Comparative Example 3, the positive electrode potential at the SOC of 100% was around 4.3 V (vs. Li/Li$^+$), because the ratio p/n was 1.0. The nonaqueous electrolyte battery according to Comparative Example 3 is believed to have developed an oxidative decomposition reaction on the surface of the positive electrode because of the high positive electrode potential, thereby failing to suppress the increase in resistance after the high-temperature storage.

It is to be noted that the reason that the high-temperature storage caused an oxidative decomposition reaction of the nonaqueous electrolyte on the surface of the positive electrode current collector in the nonaqueous electrolyte batteries according to Comparative Examples 1 and 2 is believed to be because any dense passive film of adequate thickness was not formed on the surface of the positive electrode current collector. More specifically, it is believed that the oxidative decomposition reaction on the positive electrode was accelerated in the high-temperature storage, because the positive electrode was not provided with any passive film that functions as a protective film.

The nonaqueous electrolyte battery according to Comparative Example 4 exhibits a low OCV at the SOC of 50%, and has also succeeded in suppressing the rate of resistance increase after the high-temperature storage. However, while the discharge capacity was comparable to the nominal capacity for the discharge after leaving after the initial charge in Examples 1 to 3, the discharge capacity was significantly decreased as described previously in Comparative Example 4. In Comparative Example 4, it is believed that the negative electrode potential was excessively decreased when the battery unit was charged until the positive electrode potential reached 4.1 V (vs. Li/Li$^+$), because the ratio p/n was 1.9. The nonaqueous electrolyte battery according to Comparative Example 4 is assumed to have undergone a decrease in discharge capacity due to the deterioration of the negative electrode current collector.

The nonaqueous electrolyte according to Comparative Example 5 was 1.0 in ratio p/n, and thus higher in OCV than the nonaqueous electrolyte batteries according to Examples 1 to 3. In addition, in Comparative Example 5, the positive electrode potential at the SOC of 100% was around 4.3 V (vs. Li/Li$^+$), because the ratio p/n was 1.0. In Comparative Example 5, it is believed that the positive electrode potential in the state of charge (SOC 100%) in the high-temperature storage reached around 4.3 V (vs. Li/Li$^+$), while the positive electrode potential after the initial charge (SOC 80%) stayed 4.1 V (vs. Li/Li$^+$). It is assumed that the oxidative decomposition reaction on the surface of the positive electrode have been accelerated because of the high positive electrode potential in the high-temperature storage in Comparative Example 5. As a result, it is believed that the increase in resistance after the high-temperature storage has failed to be suppressed.

The nonaqueous electrolyte battery according to Comparative Example 6 has succeeded in exhibiting a low OCV at the SOC of 50%, but failed to suppress the increase in resistance after the high-temperature storage. This is believed to be because the high-temperature storage caused the nonaqueous electrolyte to develop an oxidative decomposition reaction at the surface of the positive electrode current collector, and the product generated by the oxidative decomposition reaction which causes an increase in resistance in Comparative Example 6. Further, the reason that the high-temperature storage caused the nonaqueous electrolyte to develop an oxidative decomposition reaction on the surface of the positive electrode current collector in the nonaqueous electrolyte batteries according to Comparative Example 6 is believed to be because any dense passive film of adequate thickness was not formed on the surface of the positive electrode current collector. More specifically, it is believed that the oxidative decomposition reaction on the positive electrode was accelerated in the high-temperature storage, because the positive electrode was not provided with any passive film that functions as a protective film.

The nonaqueous electrolyte battery according to Comparative Example 7 has succeeded in exhibiting a low OCV at the SOC of 50%, but failed to suppress the increase in resistance after the high-temperature storage. This is believed to be because an oxidative decomposition reaction was developed on the surface of the positive electrode to fail to suppress the increase in resistance after the high-temperature storage, because the positive electrode potential was increased after the initial charge. In addition, while the discharge capacity was comparable to the nominal capacity for the discharge after leaving after the initial charge in Examples 1 to 3, the discharge capacity was significantly decreased as described previously in Comparative Example 7. This is believed to be because the negative electrode potential was excessively decreased when the battery unit was charged until the positive electrode potential reached 4.3 V (vs. Li/Li$^+$). The nonaqueous electrolyte battery according to Comparative Example 7 is assumed to have undergone a decrease in discharge capacity due to the deterioration of the negative electrode current collector.

The nonaqueous electrolyte battery according to Comparative Example 8 has succeeded in exhibiting a low OCV at the SOC of 50%, but failed to suppress the increase in resistance after the high-temperature storage. This is believed to be because the high-temperature storage caused the nonaqueous electrolyte to develop an oxidative decomposition reaction at the surface of the positive electrode current collector, and the product generated by the oxidative decomposition reaction caused an increase in resistance in Comparative Example 8. Further, the reason that the high-temperature storage caused the nonaqueous electrolyte to develop an oxidative decomposition reaction on the surface of the positive electrode current collector in the nonaqueous electrolyte batteries according to Comparative Example 8 is believed to be because any dense passive film of adequate thickness was not formed on the surface of the positive electrode current collector. The time period of leaving the initially charged battery unit at 25° C. was short in the initial adjustment of the battery according to Comparative Example 8. As a result, it is assumed that no dense passive film was formed. More specifically, in Comparative Example 8, it is believed that the oxidative decomposition reaction on the positive electrode was accelerated in the high-temperature storage, because the positive electrode was not provided with any passive film that functions as a protective film.

The nonaqueous electrolyte battery according to at least one of the embodiments and examples described above includes a negative electrode, a positive electrode, and a nonaqueous electrolyte. The negative electrode includes an oxide of titanium. The positive electrode includes a positive electrode current collector including aluminum, a positive electrode layer formed on the positive electrode current collector and including a nickel-cobalt-manganese composite oxide including lithium, and a passive film formed on the positive electrode current collector. A ratio p/n of a capacity p of the positive electrode to a capacity n of the negative electrode falls within the range from 1.1 to 1.8. The passive film is desirably formed at a positive electrode potential of 4.1 V (vs. Li/Li$^+$) or more. Alternatively, the passive film preferably has a region having a ratio F/Al of an emission intensity of fluorine to an emission intensity of aluminum, in which the emission intensities are obtained by radio frequency glow discharge optical emission spectrometry (GD-OES), that is 0.03 or more. In addition, the region having the ratio F/Al that is 0.03 or more is desirably present within a range of 30 nm or less in depth from the surface of the positive electrode current collector. By virtue of the foregoing, the nonaqueous electrolyte battery can exhibit a sufficiently low OCV and can exhibit excellent cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a negative electrode comprising an oxide of titanium;
a positive electrode comprising a positive electrode current collector comprising aluminum, a positive electrode layer formed on the positive electrode current collector, and comprising a nickel-cobalt-manganese composite oxide including lithium, and a passive film formed on the positive electrode current collector at a positive electrode potential of 4.1 V (vs. Li/Li$^+$) or more; and
a nonaqueous electrolyte, wherein a ratio p/n of a capacity p of the positive electrode to a capacity n of the negative electrode falls within a range from 1.1 to 1.8.

2. The nonaqueous electrolyte battery according to claim 1, wherein the oxide of titanium comprises at least one selected from a group consisting of: a lithium-titanium composite oxide having a spinel-type structure, a lithium-titanium composite oxide having a ramsdellite-type structure, a monoclinic titanium dioxide, and a monoclinic niobium-titanium composite oxide.

3. The nonaqueous electrolyte battery according to claim 2, wherein the passive film comprises AlF$_3$.

4. The nonaqueous electrolyte battery according to claim 2, wherein the negative electrode further comprises a material that can absorb and release lithium ions in a range of 0.4 V (vs. Li/Li$^+$) to 1.4 V (vs. Li/Li$^+$), or the nonaqueous electrolyte comprises at least one selected from a group consisting of vinylene carbonate, ethylene sulfite, and fluoroethylene carbonate.

5. The nonaqueous electrolyte battery according to claim 4, wherein the material comprises at least one selected from the group consisting of a lithium-cobalt nitride, a lithium-nickel nitride, and a lithium-copper nitride.

6. The nonaqueous electrolyte battery according to claim 2, wherein the battery further comprises a container that houses the negative electrode, the positive electrode, and the nonaqueous electrolyte, the container having a thickness within a range of 0.2 to 5.0 mm, and the container is a metal container comprising at least one metal selected from a group consisting of Fe, Ni, Cu, Sn, and Al.

7. The nonaqueous electrolyte battery according to claim 2, wherein the battery further comprises a container that houses the negative electrode, the positive electrode, and the nonaqueous electrolyte, the container having a thickness within a range of 0.1 to 2.0 mm, and the container is a laminate film container comprising a metal layer comprising at least one metal selected from a group consisting of Fe, Ni, Cu, Sn, and Al, and resin layers sandwiching the metal layer.

8. A battery pack comprising the nonaqueous electrolyte battery according to claim 1.

9. The battery pack according to claim 8, wherein the battery pack comprises six of the nonaqueous electrolyte batteries connected electrically in a series.

10. The battery pack according to claim 8, wherein the battery pack comprises battery modules each comprising six of the nonaqueous electrolyte batteries, the battery modules being connected electrically in a series, in parallel, or in a combination of a connection in a series and a connection in parallel.

11. A nonaqueous electrolyte battery comprising:
a negative electrode comprising an oxide of titanium;
a positive electrode comprising a positive electrode current collector comprising aluminum, a positive electrode layer formed on the positive electrode current collector, and comprising a nickel-cobalt-manganese composite oxide including lithium, and a passive film on the positive electrode current collector; and
a nonaqueous electrolyte, wherein a ratio p/n of a capacity p of the positive electrode to a capacity n of the negative electrode falls within a range from 1.1 to 1.8, and the positive electrode comprises a region within a range at a depth of 30 nm or less from a surface of the positive electrode current collector, the region having a ratio F/Al of 0.03 or more, where F is an emission intensity of fluorine obtained by radiofrequency glow discharge optical emission spectroscopy (GD-OES) and Al is an emission intensity of aluminum obtained by the GD-OES.

12. The nonaqueous electrolyte battery according to claim 11, wherein the oxide of titanium comprises at least one selected from a group consisting of: a lithium-titanium composite oxide having a spinel-type structure, a lithium-titanium composite oxide having a ramsdellite-type structure, a monoclinic titanium dioxide, and a monoclinic niobium-titanium composite oxide.

13. The nonaqueous electrolyte battery according to claim 12, wherein the passive film comprises AlF$_3$.

14. The nonaqueous electrolyte battery according to claim 12, wherein the negative electrode further comprises a material that can absorb and release lithium ions in a range of 0.4 V (vs. Li/Li$^+$) to 1.4 V (vs. Li/Li$^+$), or the nonaqueous electrolyte comprises at least one selected from a group consisting of vinylene carbonate, ethylene sulfite, and fluoroethylene carbonate.

15. The nonaqueous electrolyte battery according to claim 14, wherein the material comprises at least one selected from the group consisting of a lithium-cobalt nitride, a lithium-nickel nitride, and a lithium-copper nitride.

16. The nonaqueous electrolyte battery according to claim 12, wherein the battery further comprises a container that houses the negative electrode, the positive electrode, and the nonaqueous electrolyte, the container having a thickness within a range of 0.2 to 5.0 mm, and the container is a metal container comprising at least one metal selected from a group consisting of Fe, Ni, Cu, Sn, and Al.

17. The nonaqueous electrolyte battery according to claim 12, wherein the battery further comprises a container that houses the negative electrode, the positive electrode, and the nonaqueous electrolyte, the container having a thickness within a range of 0.1 to 2.0 mm, and the container is a laminate film container comprising a metal layer comprising at least one metal selected from a group consisting of Fe, Ni, Cu, Sn, and Al, and resin layers sandwiching the metal layer.

* * * * *